Nov. 5, 1940.    W. B. TRETHEWEY    2,220,630
MEANS FOR CONTROLLING THE DRAFT IN FURNACE FLUES
Filed July 19, 1938    3 Sheets-Sheet 1

William Bertram Trethewey
Inventor

Nov. 5, 1940.  W. B. TRETHEWEY  2,220,630
MEANS FOR CONTROLLING THE DRAFT IN FURNACE FLUES
Filed July 19, 1938  3 Sheets-Sheet 2
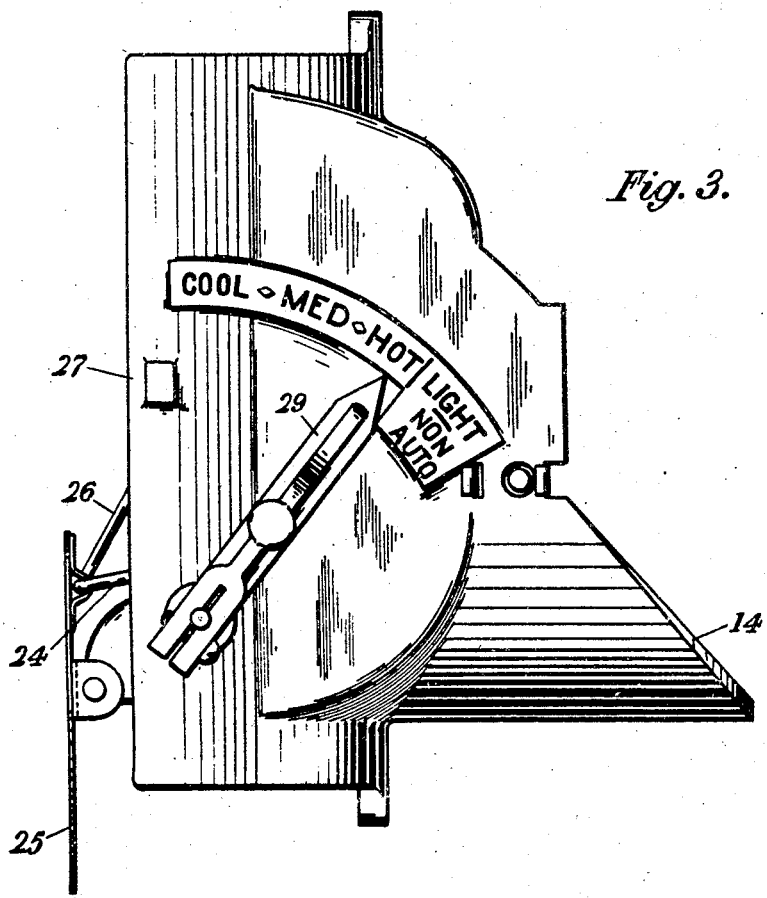
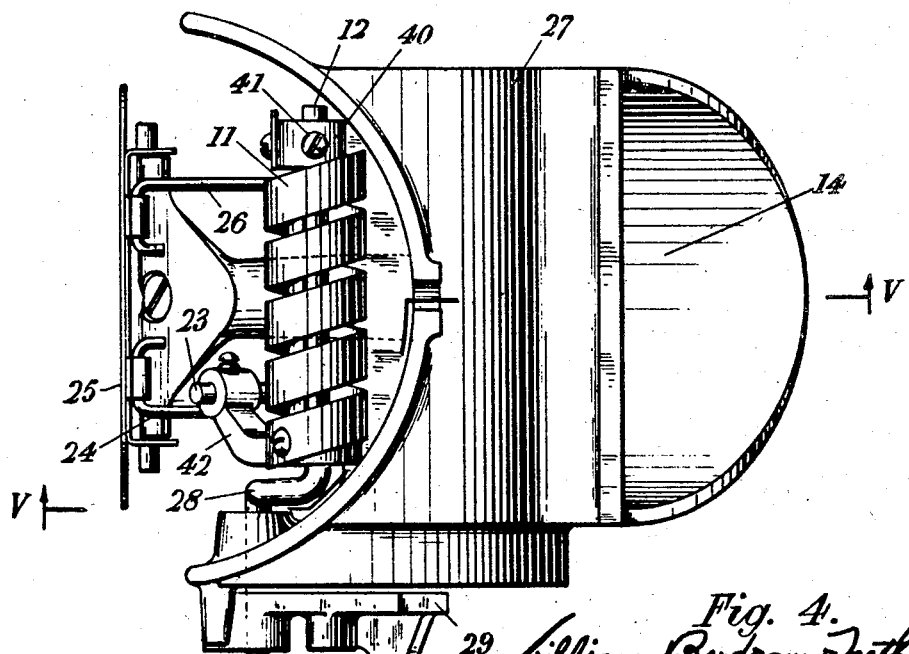

Nov. 5, 1940.   W. B. TRETHEWEY   2,220,630
MEANS FOR CONTROLLING THE DRAFT IN FURNACE FLUES
Filed July 19, 1938   3 Sheets-Sheet 3

William Bertram Trethewey
Inventor

Patented Nov. 5, 1940

2,220,630

UNITED STATES PATENT OFFICE 2,220,630

MEANS FOR CONTROLLING THE DRAFT IN FURNACE FLUES

William Bertram Trethewey, Haywards Heath, England, assignor to Furnace Controls Limited, London, England Application July 19, 1938, Serial No. 220,054
In Great Britain July 20, 1937

4 Claims. (Cl. 236—93)

This invention relates to automatic regulators, for controlling the draft in a flue, of the type comprising a thermostat positioned in the flue, a damper system, which is operable to control the draft in the flue, by checking the flow of hot gases through the flue and simultaneously admitting atmospheric air to the flue through an inlet in the side wall thereof, and an operative connection between the thermostat and the damper system arranged to position the latter so as to maintain a substantially constant temperature in the flue. With such a regulator, if the temperature of the flue gases should rise, the thermostat will move the damper system towards the minimum position, thereby admitting more air to the flue and reducing the draft through the flue, and if the temperature of the flue gases should fall, the thermostat will move the damper system towards the maximum position, thereby reducing the air supply and increasing the draft through the flue. A single damper may be employed to control both the air flow and the flow of hot gases through the flue, but it is equally possible to do this by means of a pair of interlinked dampers, one controlling the air inlet and the other the flow of hot gases through the flue.

When such a regulator is in use, it is sometimes difficult to effect rapid heating up of a furnace associated with the fire, owing to the tendency of the device to maintain in the flue a constant temperature lower than that required for rapid heating.

The object of this invention is to overcome this difficulty and to provide means whereby the furnace may be rapidly heated up when required.

The present invention provides an automatic regulator of the type described above, which includes means operable at will to reduce artificially the working temperature of the thermostat below its normal working temperature.

Thus the apparatus may include means operable to admit to the thermostat a secondary supply of air through a port in the wall of the flue, which secondary supply of air will reduce the working temperature of the thermostat and so cause it to move the damper system towards the maximum position and draw the fire up.

In one form of automatic regulator according to the invention, the regulator is provided with a shield, which is normally inoperative, but is movable at will into position to shield the thermostat from the flue gases approaching from the furnace, and which, when moved into its operative position, opens a port in the flue through which cooling air may pass to the thermostat.

By moving the shield into its operative position the thermostat will be protected from the hot gases coming from the furnace with the result that the thermostat will be kept cool and hold the damper system in the maximum position. Consequently, the furnace can be rapidly heated up and this is of particular advantage where the automatic regulator is used in conjunction with a furnace for heating a domestic hot water system, or for lighting the fire of any heater. Once the fire is properly alight it is of course desirable that the automatic regulator should once more take control and to this end the shield should be returned to its normal inoperative position. This may be done by hand, but if desired may be effected automatically by means of a thermostat responsive to the temperature of the water in the hot water system, so that once the water has reached a predetermined temperature the shield will be withdrawn and enable the thermostat and the automatic regulator to take over the control of the gases in the flue.

The water temperature can, therefore, be used to control the temperature of the fire. When the water is cold and rapid heating is required, the shield is automatically placed in operative position, with the result that a high furnace temperature will prevail. When the water, however, is sufficiently heated, the shield is withdrawn, allowing the thermostat to resume control and reduce the furnace temperature to normal again.

In the preferred form of the invention, the thermostat is mounted so as to be movable relatively to the flue into a position in which it is not exposed to the direct action of the flue gases. Thus it may be carried on a pivoted arm which can be moved, by a control outside the flue, so as to swing the thermostat from its normal position to a position in which it is located in a recess to the side of the flue. With the thermostat in its normal position it is fully exposed to the hot gases and will position the damper system to give a minimum flue temperature. In the latter position the thermostat will be shielded from the direct influence of the gases, and will therefore adjust the damper system to give a maximum flue temperature. Obviously intermediate temperatures may be obtained by setting the thermostat arm to positions between these two extremes.

It is preferred to provide in the wall of the recess a supplementary air inlet for the purpose of cooling the thermostat when the latter is moved into the recess.

In known thermostat controls for flues, the thermostat is generally placed under an initial tension so as to prevent it from actuating the damper system until the flue gases have reached a given temperature. By adopting this invention, the use of such initial tension is no longer essential, as the temperature of the thermostat can be artificially reduced while the flue is heating up, and the means for effecting such artificial reduction of the thermostat temperature can be rendered inoperative when it is required that the thermostat should assume control.

Some constructions of automatic regulator according to the invention will now be described in further detail, by way of example, with reference to the accompanying drawings, in which:

Figure 3 is a side elevation of the second construction;

Figure 4 is the corresponding plan view;

Like references indicate like parts throughout the drawings.

Figure 1:
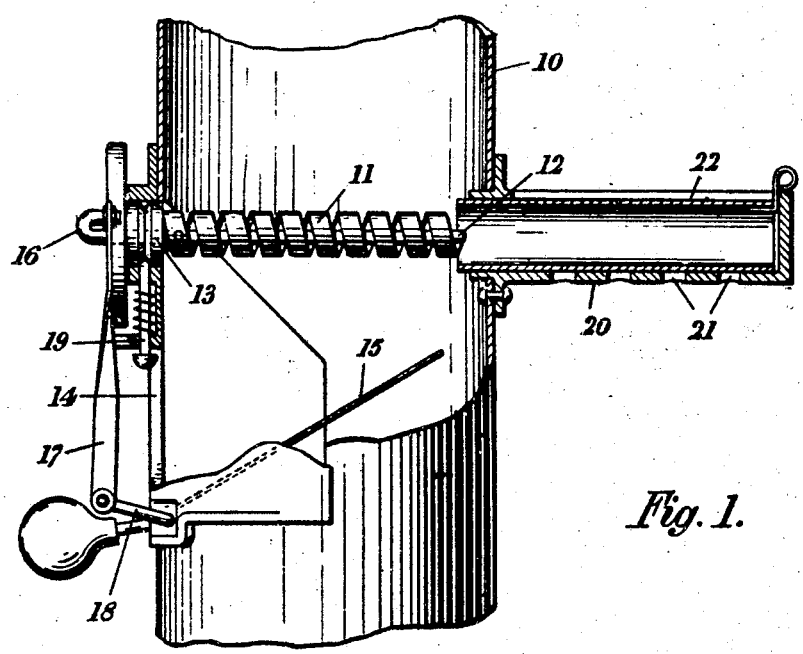
Figure 1 is a vertical section through the first construction of regulator showing the parts in the position they occupy when the thermostat is in control.
Figure 2:
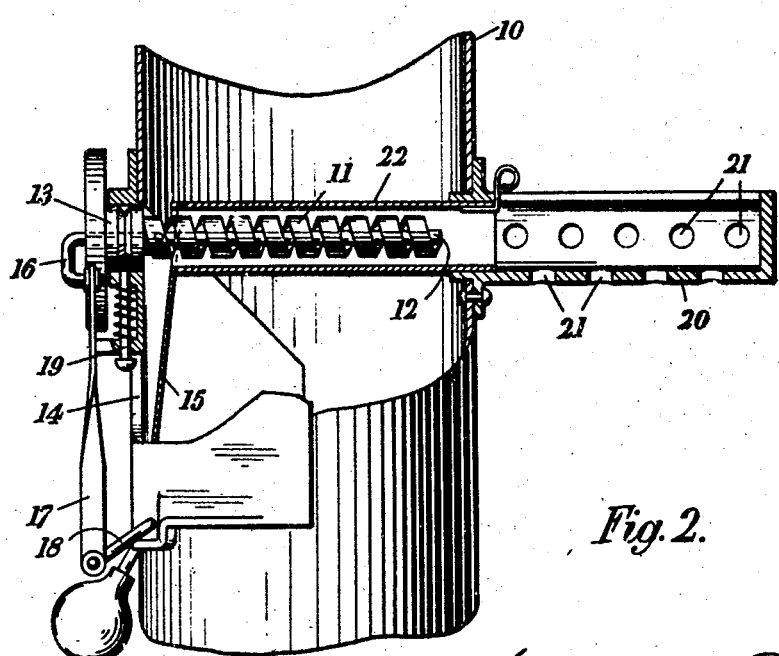
Figure 2 is a similar view but showing the parts in the position they occupy when the temperature of the thermostat is artificially reduced.
Figure 5:
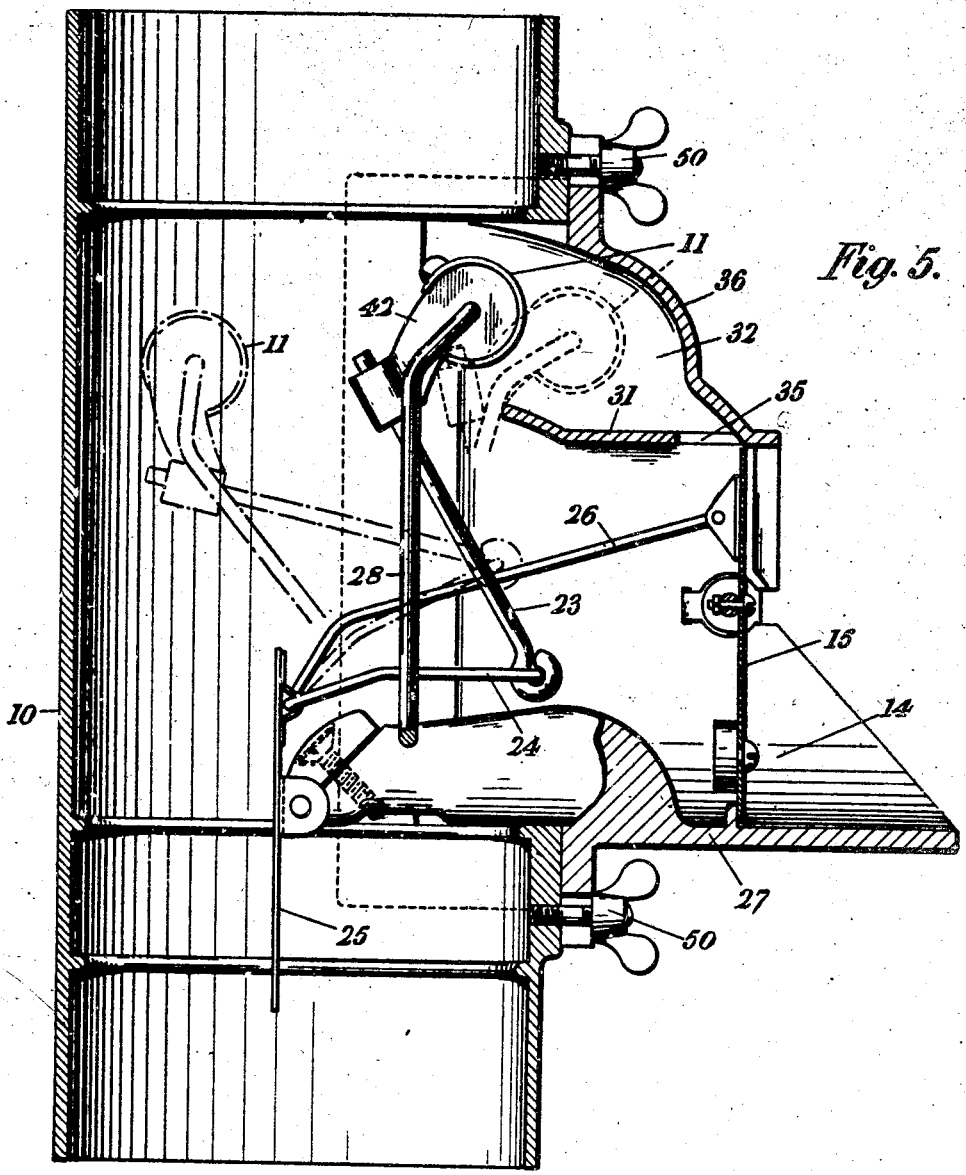
Figure 5 is a section along the line V—V in Figure 4.

In the construction shown in Figures 1 and 2, 10 represents the flue in which is positioned a thermostat 11, constituted by a bimetallic strip coiled in the form of a spiral with its one end attached to a spindle 12 and its other end attached to an anchor member 13, within which the spindle is rotatably mounted. In the wall of the flue is provided an inlet 14 for atmospheric air, this inlet being controlled by a damper 15 which also serves to control the flow of hot gases through the flue. On the end of the spindle 12 a crank 16 is formed which is connected by a link 17 to a crank arm 18 formed on one end of the hinge pin to which the damper 15 is secured. Rotation of the spindle 12, caused by the expansion or construction of the bimetallic strip, will therefore effect rotation of the damper 15 about the axis of the hinge in the direction required to maintain a constant temperature in the flue. The anchor member 13 is provided with a spring pressed pin 19 held in contact with the member 13 and forming a friction brake which normally holds the anchor member against movement relatively to the flue but is arranged to yield and permit the anchor member to turn to avoid straining of the thermostat in case the latter should be overheated.

To an aperture in the flue opposite the end of the thermostat is fitted a side tube 20 provided with ports 21 for admitting a secondary supply of air to the thermostat. These ports are normally closed by a shield 22 which is slidable within the side tube 20. When the thermostat is to assume control of the temperature in the flue, the shield 22 occupies the inoperative position shown in Figure 1 in which the thermostat is fully exposed to the action of the flue gases and in which the ports 21 are closed. When, however, it is desired artificially to reduce the working temperature of the thermostat, for example in order to facilitate rapid heating up of the furnace, the shield 22, forming a screening element, can be moved into the position shown in Figure 2 in which it protects the thermostat from the action of the flue gases and in which the ports 21 are opened to deliver a secondary supply of air to cool the thermostat. As will be seen, the effect of this artificial cooling of the thermostat is to move the damper 15 into the closed position shown in Figure 2, in which it no longer checks the passage for the flue gases and in which it permits only a very limited supply of air to enter the inlet 14.

In the second construction shown in Figure 3–6, the thermostat 11 is likewise of spiral form but is arranged to actuate two dampers 15, 25, the damper 15 controlling the air inlet 14 and the damper 25 controlling the passage for the flue gases.

The thermostat 11 is constituted by a spiral bimetallic strip attached at one end to a block 40 fixed to the thermostat spindle 12 by an adjusting screw 41. The other end of the strip is attached to a crank arm 42 carrying an extension 23 connected by a link 24 to the damper 25. By slackening the screw 41 and adjusting the block 40 relatively to the spindle 12, the tension of the thermostat can be varied.

The damper 25 is connected by a link 26 to the damper 15. Rotation of the crank arm 42 by the thermostat 11 will, therefore, effect simultaneous actuation of the two dampers 15, 25. The entire system of dampers, thermostat and actuating linkages is carried on a casting 27 fixed over a cutaway portion of the flue 10 by wing nuts 50.

To a cranked extension 28 of the spindle 12 is fixed an arm 29 which is located outside the wall of the flue and which is moveable to vary the position of the damper relatively to the flue gases. In the position of the arm designated as "cool" in the scale shown in Figure 3, the thermostat will occupy the position shown in chain-dotted lines in Figure 5. Here, the thermostat being fully exposed to the flue gases, it will operate to maintain a cool temperature in the flue. On movement of the arm through the "medium" into the "hot" position, the thermostat is brought into the full line position in Figure 5. Here it is less exposed to the hot gases and more to the air entering through the inlet 14, and so will act to maintain a higher temperature in the flue. Owing to the fact that the cranked extension 28 is larger than the link 23, the effect of moving the thermostat towards the hot position is to impose an increased tension on it, thus giving it a further tendency to maintain a hot fire and a wider range of temperatures through which it will operate.

At the side of the casting 27 a shield 31, forming a screening element, is provided. This shield forms a recess 32 in the side wall 3. When the arm 29 is moved to the "light non-auto" position, the thermostat is brought into this recess, as shown by dotted lines in Figure 5. This is the position to which the thermostat is moved when it is desired to heat the flue rapidly, as when lighting the fire, and here the thermostat is not exposed to the flue gases at all. In order to assist in cooling the thermostat when in this position, a supplementary air inlet 35 is provided, through which air will enter the recess 32 when the damper 15 is open.

Figure 6:
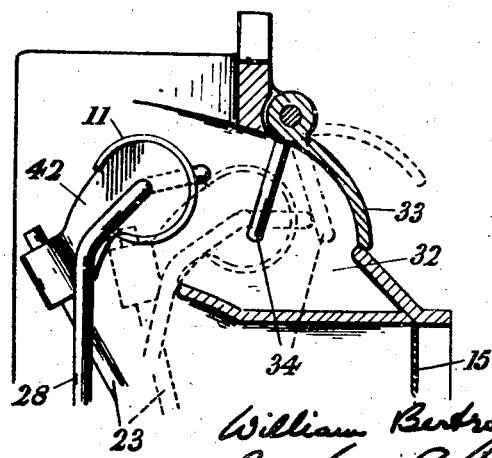
Figure 6 is a detail view, similar to Figure 5, of a modified arrangement.

In the modified arrangement shown in Figure 6, a shutter 33 normally closes the recess 32, but when the thermostat is moved into the recess it strikes against and displaces a pin 34 secured to the shutter and therefore opens the shutter to admit secondary air into the recess to cool the thermostat, as indicated by the dotted lines.

It will be appreciated that, if desired, the arm 29 could be arranged to be operated by a further master thermostat responsive to the water-temperature in a hot water system associated with the furnace to which the regulator is fitted. In this way the arm 29 would automatically take up the position required to correct a fall in the water temperature due to the withdrawal of hot water from the system.

What I claim as my invention and desire to secure by Letters Patent is:

1. An automatic regulator for controlling the draft in a flue, comprising a thermostat positioned in the flue, a damper system in the flue for controlling the draft, an operative connection between the thermostat and the damper system, a screening element for said thermostat, a pivoted arm carrying said thermostat, and a control for said pivoted arm arranged outside the flue, whereby the thermostat is movable from its normal position in which it is clear of the screening element and exposed to the flue gases to a position in which it is behind the screening element.

2. A furnace flue draft regulator comprising a thermostat element, a damper system for controlling the draft, an operative connection between the thermostat element and the damper system, a side wall for a flue having a port for the admission of supplementary air, a screening element for forming with said wall a recess for the thermostat element, and a mounting for said thermostat which is operable from the exterior of the flue to move the thermostat bodily across the flue and in a direction transverse to the length of the thermostat from a position in which it is clear of said recess into a position in which it lies in said recess.

3. An automatic regulator for controlling the draft in a flue, comprising a thermostat positioned in the flue, a damper system in the flue for controlling the draft in the flue and the admission of a supplementary supply of air thereto, an operative connection between the thermostat and the damper system and a mounting for said thermostat which is operable from the exterior of the flue to move the thermostat bodily across the flue in a direction transverse to the length of the thermostat from a position in which it is exposed to the direct action of the flue gases into a series of positions in which it is increasingly exposed to the action of the supplementary air.

4. A device for controlling the draft in a flue having an inlet for atmospheric air, comprising a casing adapted to fit over said inlet and shaped to form a recess to the side of the flue when fitted thereto, an arm pivoted to said casing and projecting from the inner face thereof, a thermostat carried on said arm, a damper system mounted on the casing and serving to control the flow of gases in the flue and the passage of air through said inlet, an operative connection between the thermostat and the damper system arranged to position the latter so as to maintain a constant flue temperature determined by the position of the thermostat relatively to the flue, and an actuating member external to the casing for rotating the arm about its pivot and thereby moving the thermostat bodily in relation to the casing in a direction transverse to the length of the thermostat for the purpose of varying the temperature maintained by the thermostat in the flue.

WILLIAM BERTRAM TRETHEWEY.